(12) United States Patent
Beckmann et al.

(10) Patent No.: US 10,284,122 B2
(45) Date of Patent: May 7, 2019

(54) METHOD FOR STOPPING A COMPRESSOR AND COMPRESSOR OF A REFRIGERATION APPLIANCE

(71) Applicant: BSH HAUSGERAETE GMBH, Munich (DE)

(72) Inventors: Tommy Beckmann, Durchhausen (DE); Volker Braun, Sontheim an der Brenz (DE); Achim Paulduro, Albeck (DE); Sebastian Rau, Stoedtlen (DE)

(73) Assignee: BSH Hausgeraete GmbH, Munich (DE)

( * ) Notice: Subject to any disclaimer, the term of this patent is extended or adjusted under 35 U.S.C. 154(b) by 25 days.

(21) Appl. No.: 15/506,791

(22) PCT Filed: Aug. 19, 2015

(86) PCT No.: PCT/EP2015/069055
§ 371 (c)(1),
(2) Date: Feb. 27, 2017

(87) PCT Pub. No.: WO2016/030253
PCT Pub. Date: Mar. 3, 2016

(65) Prior Publication Data
US 2017/0257044 A1   Sep. 7, 2017

(30) Foreign Application Priority Data

Aug. 26, 2014   (DE) .................. 10 2014 217 006

(51) Int. Cl.
*H02P 6/24*   (2006.01)
*H02P 6/14*   (2016.01)
(Continued)

(52) U.S. Cl.
CPC .............. *H02P 6/24* (2013.01); *F25B 31/023* (2013.01); *F25B 49/025* (2013.01); *H02P 6/14* (2013.01); *F25B 2600/021* (2013.01)

(58) Field of Classification Search
CPC .... H02P 6/24; H02P 6/14; F25B 31/02; F25B 49/02
See application file for complete search history.

(56) References Cited

U.S. PATENT DOCUMENTS 5,857,349 A * 1/1999 Hamaoka .............. F25B 49/025
62/158
6,452,359 B1   9/2002 Schwarz et al.
(Continued)

FOREIGN PATENT DOCUMENTS

DE        60025909 T2   10/2006
DE    102007042318 A1    3/2009
(Continued)

*Primary Examiner* — Eduardo Colon Santana
*Assistant Examiner* — Said Bouziane
(74) *Attorney, Agent, or Firm* — Laurence A. Greenberg; Werner H. Stemer; Ralph E. Locher

(57) ABSTRACT

A compressor of a refrigeration appliance includes a motor, in particular a BLDC motor, and a controller for stopping the motor. The controller is configured to slow down the motor rotating in a first rotating direction until it comes to a standstill and to subsequently position the rotor relative to the stator, in a second rotating direction with a predetermined torque. A method for stopping a compressor of a refrigeration appliance is also provided.

15 Claims, 2 Drawing Sheets

(51) Int. Cl.
*F25B 31/02* (2006.01)
*F25B 49/02* (2006.01)

(56) References Cited

U.S. PATENT DOCUMENTS 8,896,258 B2 11/2014 Abel et al.
2010/0221128 A1 9/2010 Mellar et al.

FOREIGN PATENT DOCUMENTS

DE 102010030239 A1 12/2011
JP 2006174644 A * 6/2006

* cited by examiner

METHOD FOR STOPPING A COMPRESSOR AND COMPRESSOR OF A REFRIGERATION APPLIANCE

BACKGROUND OF THE INVENTION

Field of the Invention

The present invention relates to a method for stopping a compressor and a compressor of a refrigeration appliance, in particular a domestic refrigeration appliance.

Brushless motors, in particular permanent magnet synchronous motors or PMSMs and brushless direct current motors or BLDC motors are used for example as compressor drives in refrigerators. Such electric motors have windings and a rotor which comprises a permanent magnet. When current flows through the windings, they generate a magnetic field which applies a torque to the permanent magnet, thereby causing the rotor to move. Activating the various windings in the motor in an alternating manner causes a rotating magnetic field to be generated which therefore drives the rotor.

A compressor for domestic refrigeration appliances frequently has a BLDC motor with a rotor and a stator. The motor has a compressor cylinder positioned in a fixed manner in relation to the stator, a compressor piston being able to move therein and being connected by a shaft of the rotor by way of rods, as well as a controller for activating the BLDC motor. The compressor compresses a refrigerant and conveys it into a line segment to a condenser. During an operating phase of the compressor an increasing pressure generally builds up, counter to which the compressor piston operates.

The publications DE 10 2010 030 239 A1, DE 40 09 258 C2 and DE 600 25 909 T1 disclose apparatuses and methods for starting a brushless direct current motor. Compressor drives in refrigerators have an uneven load profile which means the load they drive varies over a complete revolution of the motor, it being possible for the maximum torque to be applied by the motor to be a multiple of the average torque. When starting the motor it is therefore advantageous to move the rotor to a clearly defined position first so that the rotor has already moved through the largest possible rotation angle and been accelerated to the greatest possible rotational speed, before the maximum counter torque occurs. This is the intention of the abovementioned publications. They do not address control of the rotor position when the motor is in a stationary phase.

The maximum pressure in the cylinder is reached when the piston is in the upper dead center position. A non-return valve is arranged at the compressor output between the compressor and the condenser. The non-return valve prevents the refrigerant already conveyed into the line segment to the condenser from flowing back into the compressor. Therefore, in an operating phase the non-return valve allows a fresh intake of refrigerant during a subsequent revolution of the rotor shaft. When the compressor is in a rest phase, the non-return valve prevents pressure dropping in the condenser by way of the compressor, specifically by way of a gap between cylinder and piston. The non-return valve at the compressor output is frequently structured in the manner of a reed valve and can be pretensioned in the closing direction.

Now, when the compressor stops, the piston stops close to its upper dead center position and there is practically the same pressure on both sides of the non-return valve or in any event any pressure difference is too small to close the non-return valve counter to friction forces. When the compressor is in a stationary phase this can cause pressure to drop in the condenser by way of the compressor, with an adverse effect on the energy efficiency of the refrigeration appliance.

SUMMARY OF THE INVENTION

It is the object of the present invention to create a method and an apparatus for stopping a compressor which avoid the problem described above as far as possible.

According to one embodiment of the present invention a method for stopping a compressor, of a refrigeration appliance, wherein the compressor has a motor, a compressor cylinder, in which a compressor piston operates, which is driven by shaft of a rotor of the motor by way of a rod, comprises the method steps a) slowing down the BLDC motor, which is rotating in a first rotation direction, until it stops;

b) positioning the motor in a second rotation direction with a predefined torque; and c) terminating positioning.

According to one embodiment of the present invention a compressor of a refrigeration appliance comprises a motor and a controller for stopping the motor, the motor having a rotor and a stator, a compressor cylinder positioned in a fixed manner in relation to the stator, a compressor piston being able to move therein and being connected to a shaft of the rotor by way of a rod, as well as a controller for activating the motor, the controller being designed to slow down the motor, which is rotating in a first rotation direction, until it stops, then to position the rotor in a second rotation direction in relation to the stator with a predefined torque.

Such a positioning of the motor or the rotor of the motor allows a non-return valve at the compressor output to close reliably. A pressure drop in the condenser by way of the compressor is prevented when the compressor is in the stationary phase.

Below are further advantageous embodiments of the invention. In one preferred application in a refrigeration appliance, in particular a domestic refrigeration appliance, the motor experiences a load-dependent torque that is unevenly distributed over a rotation angle of the shaft with a maximum torque close to an upper dead center position (OT) of the compressor piston.

The second rotation direction can be oriented in the same direction as or counter to the first rotation direction. The second rotation direction is advantageously oriented counter to the first rotation direction. If the piston stops just before the OT, gas pressure plus backflow move the piston away from the OT. If the piston stops after the OT, gas pressure and momentum drive the piston far enough away from the OT for the non-return valve to close.

The motor is preferably a sensorless BLDC motor, which is activated in that the controller switches switches of an inverter that connect windings of the BLDC motor to a voltage source. The controller can have a monitor by means of which it monitors a phase angle between a voltage induced in a winding and a voltage connected to said winding. The controller can change the phase position of the voltage connected to a winding, thus accelerating the motor.

A sensorless BLDC motor can be rotated incrementally by appropriate energization, allowing defined positioning of the rotor. To this end rotation takes place with a predefined torque, energization of the stator generating a rotating magnetic field, which carries along the rotor which is fitted with permanent magnets. The predefined torque is selected so that it is smaller than the expected maximum torque so that with the next movement the rotor moves toward the OT counter to a building gas pressure and then stops far enough before the OT, while the magnetic field of the stator rotates further.

This position is particularly favorable for subsequent starting when the second rotation direction is oriented counter to the first rotation direction.

The predefined torque is advantageously generated by a value for activating the inverter and/or the voltage source stored in a storage unit. The predefined torque can be determined from the generally expected operating conditions of the refrigeration appliance and can be saved in a storage unit when the compressor or refrigeration appliance is manufactured. The motor can be operated in a voltage mode or a current mode. The torque can therefore be represented by different types of physical variable, such as the current. Scaling here results from the activation context.

Alternatively the predefined torque or control variables corresponding to said torque can be derived from a torque determined before or during method step a) or measured variables corresponding to the torque.

Positioning advantageously comprises incremental activation to rotate the BLDC motor. First the motor is rotated incrementally. At the start of positioning the rotor is carried along by the magnetic field as it rotates incrementally. When the rotor comes to a stop, the incremental activation to rotate the BLDC motor continues; the magnetic field rotates further but can no longer carry the rotor with it because the torque is small.

Positioning preferably comprises incremental activation to rotate the motor through a number of stages, which is at least equal to the number of stages corresponding to a revolution of the motor in the load-free state. This moves the rotor to a defined position which is far enough away from the OT in the case of advantageous movement in the backward direction.

The rotor can be driven by means of a pulse width modulated signal, in particular a pulse width modulated voltage signal. A torque can be selected here based on a duty cycle and/or phase of the pulse width modulated signal.

An inventive refrigeration appliance with a compressor embodied as described above can be operated with particular energy efficiency. A refrigeration appliance refers in particular to a domestic refrigeration appliance, in other words a refrigeration appliance used for domestic management in a domestic situation or in some instances also in catering, which in particular serves to store food and/or beverages in normal domestic quantities at defined temperatures, for example a refrigerator, a freezer cabinet, a combined refrigerator/freezer, a chest freezer or a wine storage cabinet.

BRIEF DESCRIPTION OF THE SEVERAL VIEWS OF THE DRAWING

Further features and advantages of the invention will emerge from the description which follows of exemplary embodiments with reference to the accompanying figures, in which.

DESCRIPTION OF THE INVENTION

Figure 1:
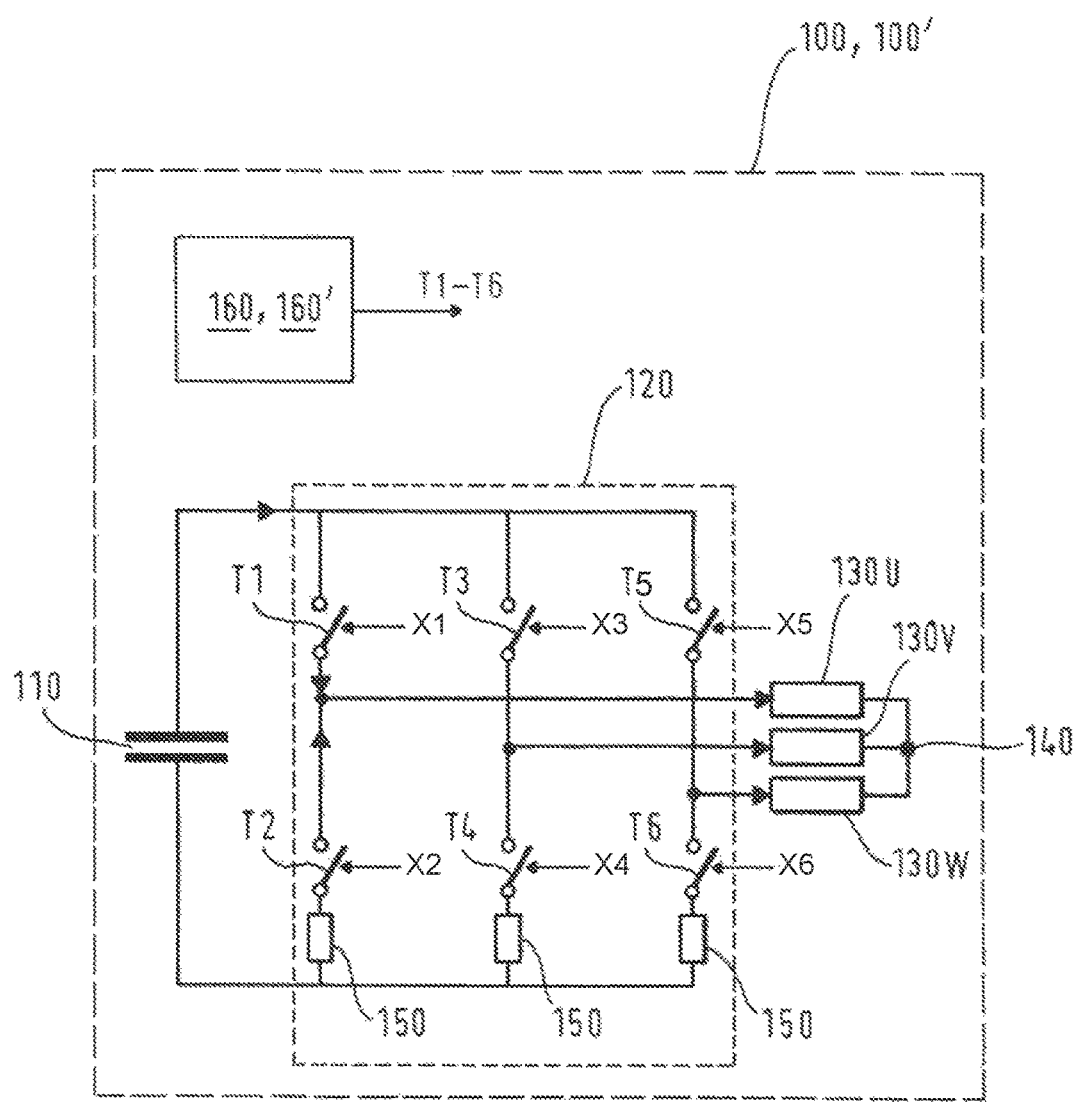
FIG. 1 shows an equivalent circuit diagram of an electric motor, which is configured as a brushless direct current motor or BLDC motor, of an inventive compressor.

Identical elements or those of identical function are shown with identical reference characters in the figures, unless otherwise stated.

FIG. 1 shows an equivalent circuit diagram of a motor 100, in this instance a brushless electric motor 100', which is configured as a PMSM or a sensorless BLDC motor and can be used for example as a compressor drive in a refrigerator. The brushless electric motor 100' has a voltage source 110, an inverter 120, three motor windings or windings 130U, 130V, 130W and a motor controller 160.

The voltage source 110 supplies an intermediate circuit voltage between an intermediate circuit supply potential and an intermediate circuit ground. The inverter 120 has six switches T1 to T6, which are arranged in the form of a B6 bridge and supply the windings 130U, 130V and 130W with current. More precisely two switches T1 and T2, T3 and T4 and T5 and T6 respectively are connected in series between the intermediate circuit supply potential and the intermediate circuit ground. The nodes between the switches T1 and T2, T3 and T4 and T5 and T6 are each connected to one side of the windings 130U, 130V and 130W. On their other side the windings 130U, 130V and 130W are connected to a star point 140. Shunt resistors 150 are also provided between the switches T2, T4 and T6 respectively and the intermediate circuit ground.

The switches T1 to T6 can each comprise for example a power transistor and a freewheeling diode connected parallel thereto. The switches T1 to T6 are activated by means of control signals X1 to X6 supplied by a controller 160, the motor controller 160'. The motor controller 160' here corresponds to an apparatus for controlling an electric motor. The windings 130 are activated in such a manner that a rotating magnetic field is generated, in which a rotor comprising a permanent magnet rotates. The brushless electric motor 100' is therefore a permanent magnet synchronous motor with three windings 130, which is supplied with a three-phase voltage by means of the B6 inverter 120.

During compressor operation the rotor moves toward the OT counter to a building gas pressure, which generates a counter torque to the drive torque of the motor and has to be overcome by the drive torque and momentum of the motor. The drive torque can be generated by energization and can be measured by measuring induced voltages.

Figure 2:
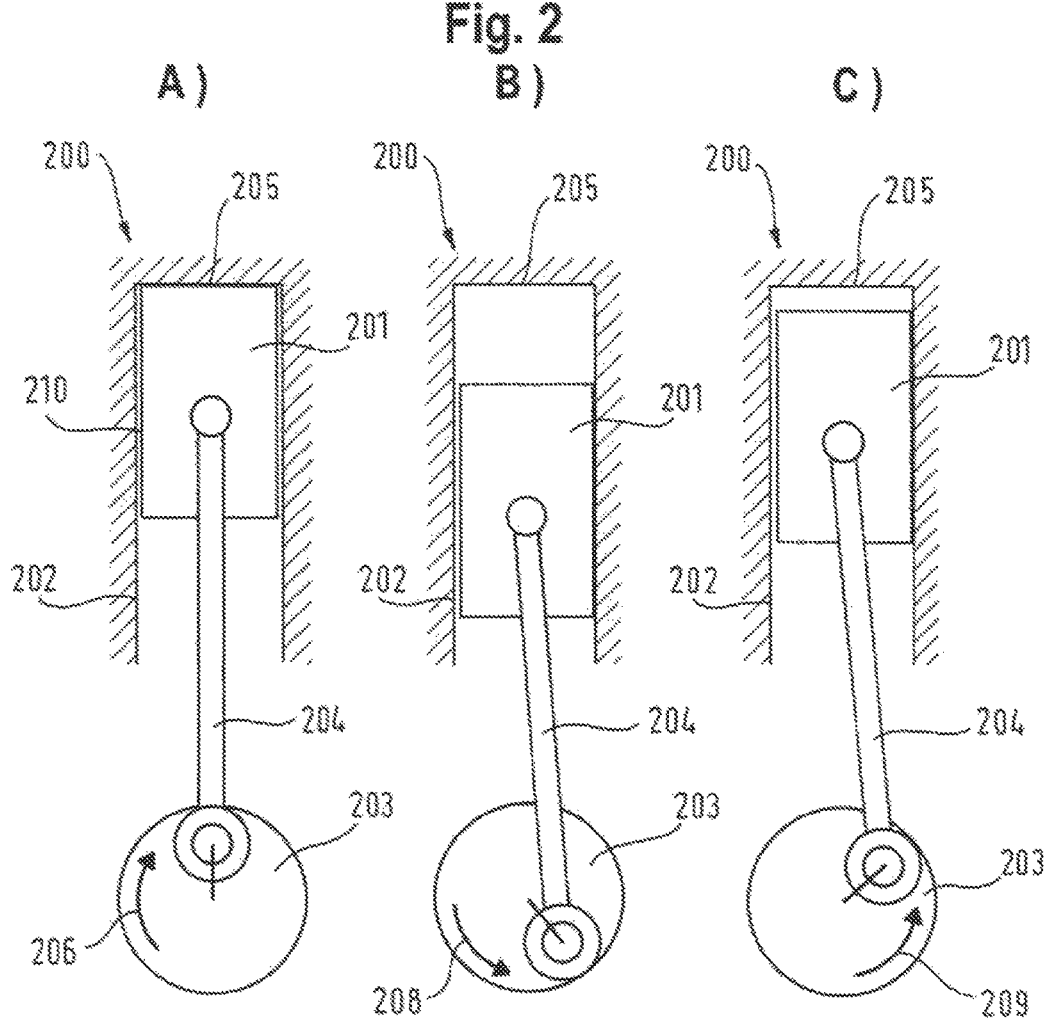
FIG. 2 shows a schematic diagram of a piston driven by a shaft in different positions in a cylinder in an inventive compressor.

FIG. 2 shows a schematic diagram 200 of a compressor mechanical system 200 of a refrigeration appliance in different working positions A), B) and C). The compressor mechanical system 200 has a piston 201, which can be moved to and fro in a cylinder 202. The compressor mechanical system has a shaft 203. A rod 204 forms a crank with the shaft 203 and is connected to the piston 201 at its free end. A gas inlet arranged in an end wall 205 of the cylinder 202 and a gas outlet with a non-return valve are not shown.

The shaft 203 is the shaft of the electric motor known from FIG. 1. The rotation direction 206 during compressor operation is shown by an arrow. The compressor of the refrigeration appliance therefore comprises the motor 100, in this instance the brushless electric motor 100', and the controller 160, in this instance the motor controller 160', for stopping the motor 100, the motor 100 having a rotor and a stator. The compressor cylinder, cylinder 202, is positioned in a fixed manner in relation to the stator. The piston 201 can be moved in the cylinder 202 and is connected to the shaft 203 of the rotor by way of the rod 204. A controller 160, specifically the motor controller 160', for activating the motor is designed to slow down the motor 160, which is rotating in a first rotation direction 206, until it stops, then to position the rotor in a second rotation direction 208, 209 (arrows) in relation to the stator with a predefined torque.

Figure 3:
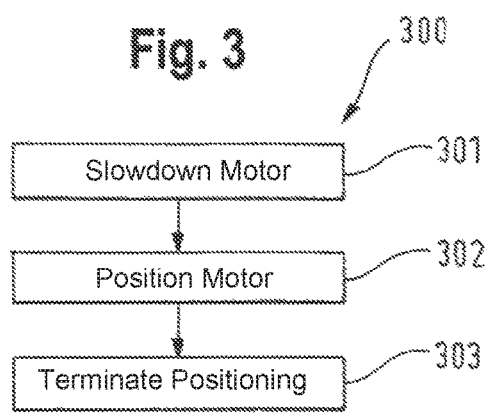
FIG. 3 shows a flow diagram of an inventive method.

FIG. 3 shows a flow diagram 300 of an inventive method for stopping a compressor of a refrigeration appliance. Reference is made to the motor known from FIG. 1 and the compressor mechanical system known from FIG. 2. The compressor has a motor, for example the electric motor 100, a compressor cylinder, in which a compressor piston can be moved, which is driven by a shaft of a rotor of the motor by way of a rod, as well as a controller for activating the motor.

The method starts with method step a) slowing down 301 the motor 100, which is rotating in a first rotation direction 206, until it stops. FIG. 2 A) shows the working position, in which the piston 201, after slowing down from compressor operation in rotation direction 206, has come to a stop randomly and unfavorably in the OT.

There follows step b) positioning 302 of the motor 100 in a second rotation direction 208 with a predefined torque. FIG. 2B) shows an intermediary working position, in which the piston 201 has been moved beyond the lower dead center position (UT), with positioning continuing. To this end the motor is rotated incrementally with a predefined torque, energization of the stator generating a rotating magnetic field, which carries along the rotor, which is fitted with permanent magnets.

The predefined torque is smaller than the selected maximum torque so during movement toward the OT the rotor has moved counter to a building gas pressure and has then stopped far enough before the OT, while the magnetic field of the stator has rotated further until positioning is terminated. FIG. 2C) shows a final working position, in which the piston 201 has come to a stop well before the OT at the end of positioning.

Finally with step c) positioning is terminated (303). The rotating stator magnetic field is now deactivated and the piston 201 is still in the final position shown in FIG. 2C), in which it was positioned in a controlled manner.

Such a positioning of the motor or the rotor of the motor allows a non-return valve at the compressor output to close reliably. A pressure drop in the condenser by way of the compressor, specifically in FIG. 2 by way of a gap 210 between piston 201 and cylinder 202, is prevented when the compressor is in the stationary phase.

Reference is now made to advantageous embodiments of the invention. In the example the second rotation direction 208, 209 is oriented counter to the first rotation direction 206.

The motor 100 is a PMSM or a sensorless BLDC motor, which is activated in that the controller 160 switches switches T1 . . . T6 of an inverter 120, the switches T1 . . . T6 connecting windings, windings 130U, 130V, 130W, of the PMSM or the BLDC motor to a voltage source 110. The predefined torque can be generated by a value for activating the inverter 120 and/or the voltage source 110 stored in a storage unit. The predefined torque can be determined from the generally expected operating conditions of the refrigeration appliance and can be saved in a storage unit when the compressor or refrigeration appliance is manufactured. The motor can be operated in a voltage mode or a current mode. The torque can therefore be represented by different types of physical variable, such as current or voltage. Scaling here results from the activation context.

Alternatively the predefined torque or control variables corresponding to said torque can be derived from a torque determined before or during method step a) or measured variables corresponding to the torque.

An inventive refrigeration appliance with a compressor embodied as described above can be operated with particular energy efficiency. A refrigeration appliance refers in particular to a domestic refrigeration appliance, in other words a refrigeration appliance used for domestic management in a domestic situation or in some instances also in catering, which in particular serves to store food and/or beverages in normal domestic quantities at defined temperatures, for example a refrigerator, a freezer cabinet, a combined refrigerator/freezer, a chest freezer or a wine storage cabinet.

LIST OF REFERENCE CHARACTERS 100, 100' Motor, electric motor
110 Voltage source
120 Inverter
130U, 130V, 130W Windings
140 Star point
150 Resistor
160, 160' Controller, motor controller
200 Compressor mechanical system
201 Piston
202 Cylinder
203 Shaft
204 Rod
205 End wall
206, 208, 209 Rotation direction
210 Gap
300 Flow diagram
301 Slowing down
302 Positioning
303 Positioning terminated
T1 . . . T6 Switches

The invention claimed is:

1. A method for stopping a compressor of a refrigeration appliance, the method comprising the following steps:
    providing a refrigeration appliance compressor motor including a cylinder, a piston operating in the cylinder, a piston rod, a rotor and a rotor shaft connecting the rotor to the piston rod, the motor experiencing a load-dependent torque being unevenly distributed over a rotation angle of the rotor shaft, with a maximum torque close to an upper dead center position of the compressor piston;
    a) slowing down the motor rotating in a first rotation direction until the motor stops;
    b) positioning the rotor in a second rotation direction with a predefined torque, the predefined torque being selected to be smaller than the maximum torque, so that with the next movement, the rotor moves toward the upper dead center position, counter to a building gas pressure, and stops before the upper dead center position; and
    c) terminating the positioning.

2. The method according to claim 1, wherein the second rotation direction is oriented counter to the first rotation direction.

3. The method according to claim 1, which further comprises:
    providing the motor as a brushless motor, a PMSM or a sensorless BLDC motor having windings;
    providing an inverter having switches; and
    using a controller to switch the switches and connect the windings to a voltage source to activate the motor.

4. The method according to claim 3, which further comprises generating a predefined torque using a value stored in a storage unit for activating at least one of the inverter or the voltage source.

5. The method according to claim 4, which further comprises deriving the predefined torque or control variables corresponding to the predefined torque from a torque determined before or during step a) or measured variables corresponding to the torque.

6. The method according to claim 3, wherein the positioning step includes incremental rotation of the motor.

7. The method according to claim 3, wherein the positioning step includes incremental activation to rotate the motor.

8. The method according to claim 7, wherein the positioning step includes incremental activation to rotate the motor through a number of stages being at least equal to a number of stages corresponding to a revolution of the motor in a load-free state.

9. A compressor of a refrigeration appliance, the compressor comprising:
a refrigeration appliance compressor motor including a stator, a rotor having a rotor shaft, a cylinder being fixedly positioned relative to said stator, a piston being movable in said cylinder and a piston rod connecting said piston to said rotor shaft, said motor experiencing a load-dependent torque being unevenly distributed over a rotation angle of the rotor shaft, with a maximum torque close to an upper dead center position of the compressor piston; and
a controller for stopping and activating said motor, said controller being configured to slow down said motor rotating in a first rotation direction until said motor stops, and to then position said rotor in a second rotation direction relative to said stator with a predefined torque, said predefined torque being selected to be smaller than the maximum torque, so that with the next movement, the rotor moves toward the upper dead center position, counter to a building gas pressure, and stops before the upper dead center position.

10. The compressor according to claim 9, wherein said second rotation direction (208, 209) is oriented counter to said first rotation direction.

11. The compressor according to claim 9, which further comprises:
an inverter having switches;
said motor being a brushless motor, a PMSM or a sensorless BLDC motor having windings; and
said controller being configured to activate said motor by switching said switches to connect said windings to a voltage source.

12. The compressor according to claim 11, wherein said predefined torque is generated by a value stored in a storage unit for activating at least one of said inverter or the voltage source.

13. The compressor according to claim 11, wherein said controller is configured to derive said predefined torque from a determined torque or to derive control variables corresponding to said predefined torque from measured variables corresponding to said torque.

14. The compressor according to claim 11, wherein said positioning of said rotor by said controller includes incremental activation to rotate said motor.

15. A refrigeration appliance, comprising a compressor according to claim 9.

* * * * *